United States Patent
Kuribayashi et al.

(10) Patent No.: US 9,248,752 B2
(45) Date of Patent: Feb. 2, 2016

(54) CHARGING CONTROL SYSTEM, CHARGING CONTROL METHOD, AND RECORDING MEDIUM

(75) Inventors: Ryosuke Kuribayashi, Tokyo (JP); Hitoshi Yano, Tokyo (JP); Koji Kudo, Tokyo (JP); Kazuhiko Ogimoto, Tokyo (JP); Kazuto Kataoka, Tokyo (JP); Takashi Ikegami, Tokyo (JP)

(73) Assignees: NEC CORPORATION, Tokyo (JP); THE UNIVERSITY OF TOKYO, Tokyo (JP)

( * ) Notice: Subject to any disclaimer, the term of this patent is extended or adjusted under 35 U.S.C. 154(b) by 214 days.

(21) Appl. No.: 14/002,678

(22) PCT Filed: Feb. 13, 2012

(86) PCT No.: PCT/JP2012/053263
§ 371 (c)(1),
(2), (4) Date: Aug. 30, 2013

(87) PCT Pub. No.: WO2012/120976
PCT Pub. Date: Sep. 13, 2012

(65) Prior Publication Data
US 2013/0335032 A1 Dec. 19, 2013

(30) Foreign Application Priority Data
Mar. 4, 2011 (JP) .................. 2011-047838

(51) Int. Cl.
*B60L 11/18* (2006.01)
*H02J 3/14* (2006.01)
*H02J 7/00* (2006.01)
*H02J 13/00* (2006.01)
*H01M 10/44* (2006.01)

(52) U.S. Cl.
CPC .......... *B60L 11/1824* (2013.01); *B60L 11/184* (2013.01); *B60L 11/185* (2013.01);
(Continued)

(58) Field of Classification Search
CPC . B60L 11/1824; B60L 11/1846; H02J 7/0027
USPC ........................................ 320/137
See application file for complete search history.

(56) References Cited

U.S. PATENT DOCUMENTS 8,054,048 B2 * 11/2011 Woody et al. ................. 320/162
8,085,034 B2 * 12/2011 Sirton ........................... 324/104
(Continued)

FOREIGN PATENT DOCUMENTS

EP      2 131 469 A2    12/2009
JP      2000-209707 A    7/2000
(Continued)

OTHER PUBLICATIONS

Extended European Search Report dated Apr. 17, 2015.
(Continued)

*Primary Examiner* — Sun Lin
(74) *Attorney, Agent, or Firm* — McGinn IP Law Group, PLLC (57) ABSTRACT

A charging control system that controls charging of a plurality of vehicles that run on electricity includes: an assignment unit that assigns an order of priority relating to charging to the plurality of vehicles based on a predetermined index; a receiving unit that receives electric power demands that are requested from an electric power supply side; and a control unit that selects from among the plurality of vehicles in the order of highest priority charging-object vehicles in which the ON/OFF setting for turning charging ON and OFF is to be set to ON, and sets the ON/OFF setting of charging-object vehicles to the ON setting. The control unit changes the number of charging-object vehicles in response to changes in electric power demands over time.

18 Claims, 8 Drawing Sheets

(52) U.S. Cl.
CPC ......... *B60L11/1816* (2013.01); *B60L 11/1842* (2013.01); *B60L 11/1844* (2013.01); *B60L 11/1846* (2013.01); *B60L 11/1848* (2013.01); *H02J 3/14* (2013.01); *H02J 7/0013* (2013.01); *H02J 7/0027* (2013.01); *H02J 13/0006* (2013.01); *B60L 2240/70* (2013.01); *B60L 2240/80* (2013.01); *H01M 10/441* (2013.01); *H01M 2220/20* (2013.01); *Y02E 60/721* (2013.01); *Y02T 10/7005* (2013.01); *Y02T 10/7055* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 30/12* (2013.01)

(56) References Cited

U.S. PATENT DOCUMENTS

| | | | |
|---|---|---|---|
| 2009/0091291 | A1 | 4/2009 | Woody et al. |
| 2010/0114798 | A1 | 5/2010 | Sirton |
| 2010/0217485 | A1 | 8/2010 | Ichishi |

FOREIGN PATENT DOCUMENTS

| | | |
|---|---|---|
| JP | 2001-069678 A | 3/2001 |
| JP | 2008-067418 A | 3/2008 |
| JP | 2009-136109 A | 6/2009 |
| JP | 2010-110173 A | 5/2010 |
| JP | 2010-187453 A | 8/2010 |

OTHER PUBLICATIONS

Papadopoulos P., et al.: "Predicting Electronic Vehicle Impacts on Residential Distribution Networks with Distributed Generation", Vehicle Power and Propulsion Conference (VPPC), 2010 IEEE, IEEE, Sep. 1, 2010, pp. 1-5.

International Search Report (ISR) (PCT Form PCT/ISA/210), in PCT/JP2012/053263, dated May 1, 2012.

G.K. Venayagamoorthy et al., "Real-Time Modeling of Distributed Plug-in Vehicles for V2G Transactions," Energy Conversion Congress and Exposition, 2009. ECCE 2009. IEEE, 3937-3941 (2009).

* cited by examiner

EV Table at a particular time point "t" (Example)

| Priority of charging | EV ID number | EV connection state (1: connected; 0: disconnected) | Required charging amount Qn [kWh] | Possible charging time Tn [hour] | Fixed charging speed pn [kW] | Priority of charging index POC |
|---|---|---|---|---|---|---|
| 1 | 33 | 1 | 12 | 2.0 | 3.0 | 2.00 |
| 2 | 7 | 1 | 10 | 4.5 | 2.0 | 1.11 |
| 3 | 14 | 1 | 5 | 2.0 | 3.0 | 0.83 |
| ... | ... | | | ... | | |
| 14 | 28 | 1 | 2 | 6.0 | 1.5 | 0.22 |
| 15 | 9 | 1 | 8 | 9.0 | 4.5 | 0.20 |
| ... | ... | | | ... | | |
| N | x | 0 | – | – | – | 0 |

Charging ON: rows 1–15

Priority of charging index (Example)
POC (Priority of Charging)
= (required charging time Yn) / (possible charging time Tn)
= Required charging amount Qn / fixed charging speed pn )
    / (possible charging time Tn)

CHARGING CONTROL SYSTEM, CHARGING CONTROL METHOD, AND RECORDING MEDIUM

TECHNICAL FIELD

The present invention relates to a charging control system, a charging control method, and a recording medium for motor vehicles that run on electricity including hybrid electric vehicles that are equipped with a storage battery together with another motive power source.

BACKGROUND ART

As environmental problems becomes increasingly serious in recent years, renewable power sources such as solar cells and wind power generators that are rapidly being put into use are considered to be an effective means for achieving lower carbon emissions and solving the problem of energy resources. However, these types of renewable power sources experience large fluctuations in output. As a result, from the standpoint of electrical quality, an adjustment means is indispensable for offsetting the fluctuations in output of the renewable power sources. Thermal power generators, which feature rapid response speed, are currently the chief means used as such adjustment means. Thus, a dilemma may arise in which, as renewable electric power sources are increased, the number of thermal electric power generators that are not environmentally friendly need to be increased as adjustment means that adjusts large output fluctuations of the renewable electric power sources. Obtaining a powerful adjustment means to take the place of thermal power generators is therefore a major issue. As such an adjustment means, the introduction of high-capacity storage batteries (such as sodium sulfur batteries) is effective, but from the standpoint of installation and operating costs, the introduction of high-capacity storage batteries is considered to face extremely high obstacles.

Great strides are being made in research relating to V2G (Vehicle-to-Grid) technology that, by effecting multiple linkage and operation, employs the storage batteries that are mounted in vehicles that run on electricity (hereinbelow referred to as EV (Electric Vehicles) that include hybrid electric vehicles that are equipped with storage batteries together with another motive power source) and that are expected to rapidly come into widespread use, similar to renewable power sources and the chargers to which these storage batteries are connected as virtual high-capacity storage batteries for electric power system stabilization. The V2G proposal itself dates to the 1980s, and research reports estimating the extent of the macro stabilization effect over an entire electric power system network have been issued continuously. In the past few years, the reports have come to focus on technology relating to real-time control, and moreover, micro control methods, i.e., individual charging and discharging of multiple EVs for the construction of an actual system.

For example, Non-Patent Document 1 describes a charging/discharging control method for implementing optimum scheduling by Particle Swarm Optimization (PSO), which is inspired by the movement of a school of fish, by setting EV operation models, distribution network models, and time-variation models of the price of electric power.

Patent Document 1 describes the configuration of an EV charging planning device and refers to optimum charging scheduling that uses a genetic algorithm.

A case that assumes not only the charging of an EV but also the discharging from the EV to the distribution network (electric power system side) is typically referred to as V2G. However, a case that assumes only charging of an EV may be referred to as G2V to distinguish from V2G. G2V is assumed to decrease the load upon the internal storage batteries of an EV in proportion to the decrease of the number of charge/discharge cycles.

LITERATURE OF THE PRIOR ART

Patent Documents

Patent Document 1: Japanese Unexamined Patent Application Publication No. 2000-209707

Non-Patent Documents

Non-Patent Document 1: G. K. Venayagamoorthy et al., "Real-Time Modeling of Distributed Plug-in Vehicles for V2G Transactions," Energy Conversion Congress and Exposition, 2009. ECCE 2009. IEEE, 3937-3941 (2009).

SUMMARY OF THE INVENTION

Problem to be Solved by the Invention

As envisioned in the future, when a battery controller that is mounted in an EV is closed within the EV and independently controls the charging speed of the storage battery in the EV, it is highly likely that only controlling the charging ON/OFF will be possible from outside the EV and continuous adjustment of the charging speed will not be possible.

The issue at hand is therefore the need for a charging control system that will facilitate the practical implementation of a multiple-EV linked charging system that can serve as an adjustment means that attends to the fluctuations in output of a renewable power source even for cases in which only the controlling the charging ON/OFF can be carried out from outside the EV and continuous adjustment of the charging speed cannot be implemented.

It is an object of the present invention to provide a charging control system, charging control method, and program that can provide a solution to the above-described problem.

Means for Solving the Problem

A charging control system of the present invention for achieving the above-described object is a charging control system that controls charging of a plurality of vehicles that run on electric power and includes:

assignment means that, based on a predetermined index, assigns to the plurality of vehicles an order of priority relating to charging;

receiving means that receives electric power demands that are requested from the electric power supply side; and control means that selects from among the plurality of vehicles according to higher order of priority charging-object vehicles in which the ON/OFF setting for ON/OFF of the charging is to be set to ON, and that sets the ON/OFF setting of the charging-object vehicles to ON;

wherein the control means changes the number of the charging-object vehicles according to changes of said electric power demands over time.

A charging control method of the present invention is a charging control method in a charging control system that controls charging of a plurality of vehicles that run on electric power and includes:

based on a predetermined index, assigning to the plurality of vehicles an order of priority relating to charging;

receiving electric power demands that are requested from the electric power supply side; and selecting from among the plurality of vehicles in the order of higher order of priority charging-object vehicles in which the ON/OFF setting relating to the ON/OFF of the charging is to be set to ON and implementing control to set the ON/OFF setting of the charging-object vehicles to ON;

wherein, in the control, the number of the charging-object vehicles changes according to changes of said electric power demands over time.

A recording medium of the present invention is a recording medium that can be read by a computer and on which a program is recorded that causes a computer for controlling charging of a plurality of vehicles that run on electric power to execute:

an assignment procedure of, based on a predetermined index, assigning an order of priority relating to charging of the plurality of vehicles;

a reception procedure of receiving electric power demands that are requested from the electric power supply side; and a control procedure of selecting from among the plurality of vehicles in the order of higher order of priority charging-object vehicles in which the ON/OFF setting regarding the ON/OFF of the charging is to be set to ON and implementing control to set the ON/OFF setting of the charging-object vehicles to ON;

wherein, in the control procedure, the number of the charging-object vehicles changes according to changes of said electric power demands over time.

Effect of the Invention

Due to the above-described configuration, the present invention can promote the practical implementation of a multiple-EV linked charging system that can serve as an adjustment means that attends to, for example, fluctuations in output of a renewable power source even in cases in which only the setting of ON/OFF of charging can be effected from outside the EVs and continuous adjustment of charging speed cannot be effected.

MODE FOR CARRYING OUT THE INVENTION

An exemplary embodiment of the present invention is next described with reference to the accompanying drawings.

Figure 1:
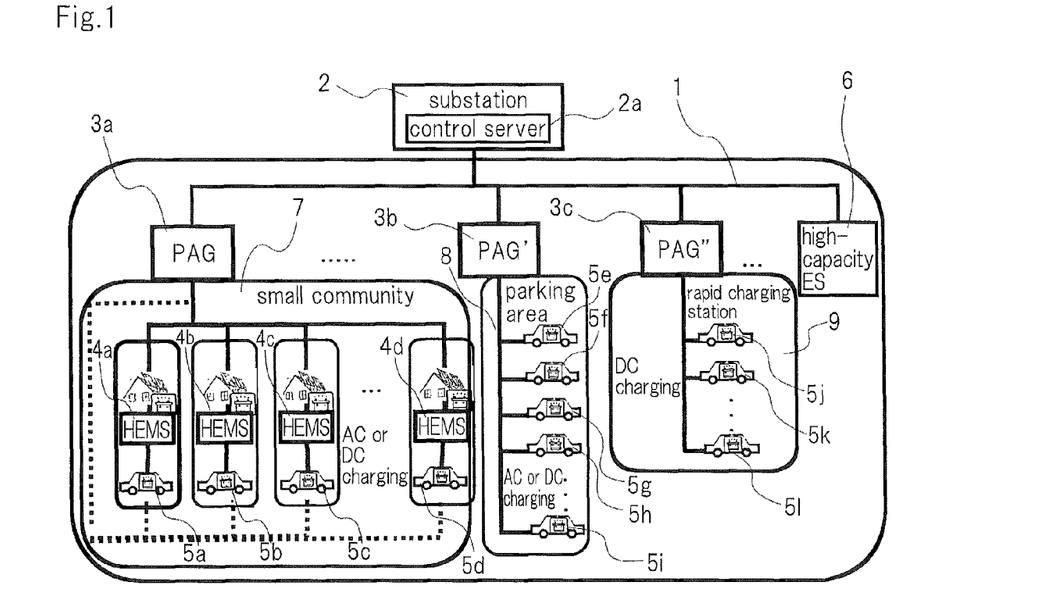
FIG. 1 shows the overall configuration of an example of the charging environment of electric vehicles in which the charging control system of the present invention has been adopted.
Figure 2:
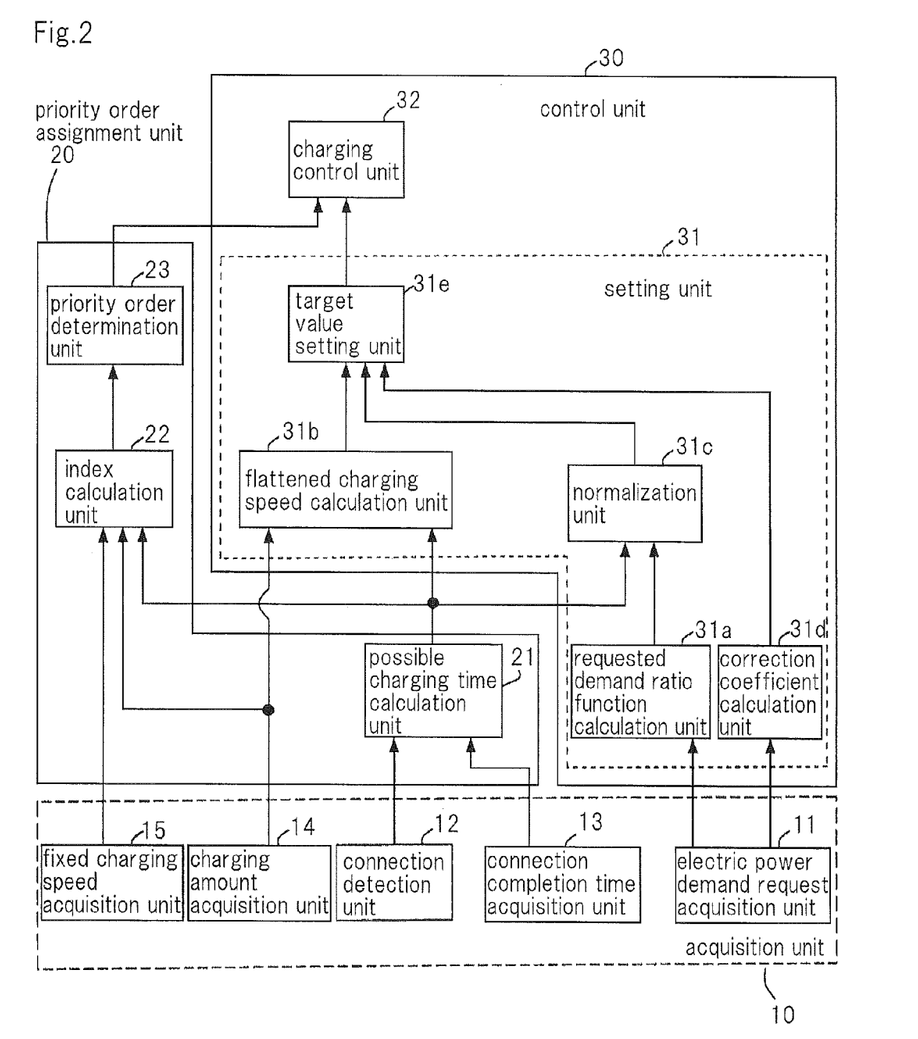
FIG. 2 shows the configuration of the electric power aggregators shown in FIG. 1.

FIG. 1 shows an example of the charging environment of electric vehicles in which the charging control system of an exemplary embodiment of the present invention has been adopted. FIG. 2 shows the configuration of electric power aggregators $3a$-$3c$ shown in FIG. 1.

As shown in FIG. 1, the present example is a system that allows charging of electric vehicles EV $5a$-$5l$ in small community 7, in parking area 8, or at fast charging station 9. Electric power aggregators $3a$-$3c$ are provided corresponding to each of small community 7, parking area 8, and fast charging station 9. These electric power aggregators $3a$-$3c$ are connected to substation 2 by way of electric power distribution network and information communication network 1. Electric power control server $2a$ is provided at substation 2. In addition, HEMS (Home Energy Management Systems) $4a$-$4d$ are provided in small community 7. High-capacity energy storage 6 is also connected to electric power distribution network and information communication network 1.

As shown in FIG. 2, each of electric power aggregators $3a$-$3c$ includes acquisition unit 10, priority order assignment unit 20, and control unit 30. In FIG. 2, constructions corresponding to an actual example to be described are shown as the constructions of each of acquisition unit 10, priority order assignment unit 20, and control unit 30. The constructions of each of acquisition unit 10, priority order assignment unit 20, and control unit 30 are not limited to those shown in FIG. 2 and can be modified as appropriate.

Acquisition unit 10 is an example of the reception means. Acquisition unit 10 includes electric power demand request acquisition unit 11, connection detection unit 12, connection completion time acquisition unit 13, charging amount acquisition unit 14, and fixed charging speed acquisition unit 15. Acquisition unit 10 receives electric power demands from the electric power supply side.

Priority order assignment unit 20 is one example of the assignment means. Priority order assignment unit 20 includes possible charging time calculation unit 21, index calculation unit 22, and priority order determination unit 23. Priority order assignment unit 20 assigns an order of priority relating to the charging of a plurality of EVs based on, for example, a predetermined index.

Control unit 30 is an example of the control means. Control unit 30 includes setting unit 31 and charging control unit 32. Control unit 30 selects from among a plurality of EVs in the order of higher priority charging-object vehicles in which, for example, the ON/OFF setting for ON/OFF of charging is to be set to ON and sets the ON/OFF setting of the charging-object vehicles to ON. Control unit 30 then changes the number of charging-object vehicles according to changes of the electric power demands over time.

Setting unit 31 includes requested demand ratio function calculation unit $31a$, flattened charging speed calculation unit $31b$, normalization unit $31c$, correction coefficient calculation unit $31d$, and target value setting unit $31e$.

These constituent elements are actually assumed to be realized by a program that is installed in electric power aggregators 3a-3c and are also assumed to be provided in HEMS 4a-4d.

In the charging control system that is configured as described hereinabove, electric power aggregators 3a-3c check the possible charging time, required charging amount, and the charging speed inherent to the EV for each of electric vehicles EV 5a-5l at the same time as the start of connection to chargers (power distribution network).

At each time point, electric power aggregators 3a-3c assign an order of priority relating to charging to each EV based on the possible charging time, the required charging amount, and the charging speed inherent to the EV. The time points may each be times at fixed time intervals or times that are set in advance. In the following explanation, each time point also refers to "each predetermined time."

Electric power aggregators 3a-3c select in order from EVs having the highest order of priority a number of EVs that satisfies the desired total electric power demand that is the target as the charging-object EVs (charging-object vehicles).

Electric power aggregators 3a-3c set the ON setting of charging only for charging-object EVs.

The charging speed when charging is ON is assumed to be set to a value that is inherent to each EV (charging speed that is inherent to the EV).

In addition, electric power aggregators 3a-3c acquire the electric power demand requests that are data for prescribing the total electric power demand that is the target from the electric power supply (electric power company) side (for example, control server 2a) that, it is assumed, wishes to adjust the electric power demand.

The electric power demand requests include time sequence data that reflect the mid- to long-term electric power demand requests (for example, electric power prices that vary over time) and sudden electric power demand requests that occur due to accidents and short-term fluctuations in the output of renewable power sources.

Electric power aggregators 3a-3c calculate the total electric power demand that is the target (the target value of charging demand) based on the time sequence data that reflect the mid- to long-term electric power demand requests and the sudden electric power demand requests.

Electric power aggregators 3a-3c thus carry out charging scheduling, i.e., the determination of the charging ON/OFF state of each EV for each time point. Electric power aggregators 3a-3c control the storage batteries of electric vehicles EV 5a-5l and charging equipment based on the result of the charging scheduling.

The charging control method in the charging control system that is configured as described hereinabove is next described.

Figure 3A:
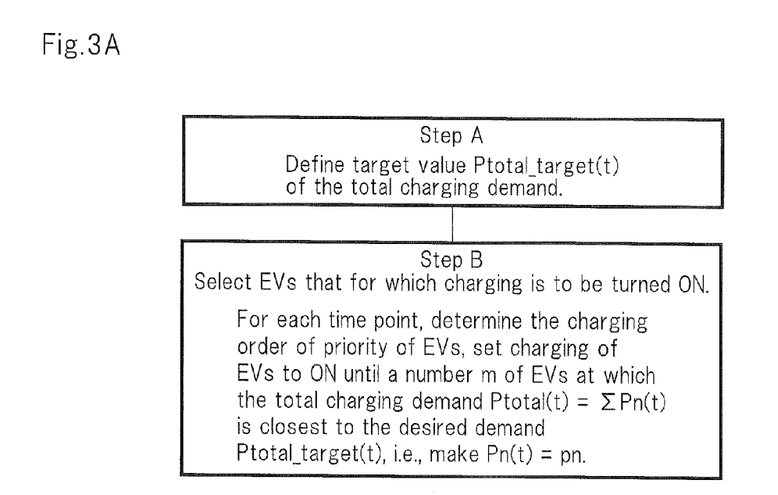
FIG. 3A is a view for describing the basic concept of the charging control method in the charging control system shown in FIG. 1.

FIG. 3A is a view for describing an outline of the charging control method in the charging control system shown in FIG. 2.

Setting unit 31 first receives time sequence data relating to mid- and long-term electric power demand requests presented by the electric power supply (electric power company) side and the sudden electric power demand requests that immediately precede the charging presented from the electric power supply (electric power company) side. Setting unit 31 next defines (sets) the target value Ptotal_target(t) of the total charging demand at each time point based on the time sequence data relating to mid- to long-term electric power demand requests and the sudden electric power demand requests (Step A).

Here, time sequence data relating to the mid- to long-term electric power demand requests include, for example, electric power prices that change depending on time.

The target value Ptotal_target(t) of the total charging demand includes advance scheduling as a portion that reverts to mid- to long-term electric power demand requests, and further, "real-time response" that reverts to sudden electric power demand requests.

No particular limitations are imposed on the method of defining the target value Ptotal_target(t) of the total charging demand, but an example of this method will be described hereinbelow.

When each EV next arrives at a parking area and connects to the charging equipment (distribution network), priority order assignment unit 20 receives the scheduled time of connection completion (departure) of each EV from acquisition unit 10 for each predetermined time point. Priority order assignment unit 20 next calculates the possible charging time Tn from the scheduled time of connection completion (departure) and a desired charging time margin. Priority order assignment unit 20 further receives from acquisition unit 10 at each predetermined time a charging amount (required charging amount) Qn that is required for each EV and a charging speed (inherent charging speed) pn that is inherent to each EV.

At each time point, priority order assignment unit 20 determines the priority of charging of EV based on the possible charging time Tn, the required charge amount Qn, and the inherent charging speed pn of each EV.

In this case, n is the ID number of each EV.

Figure 3B:
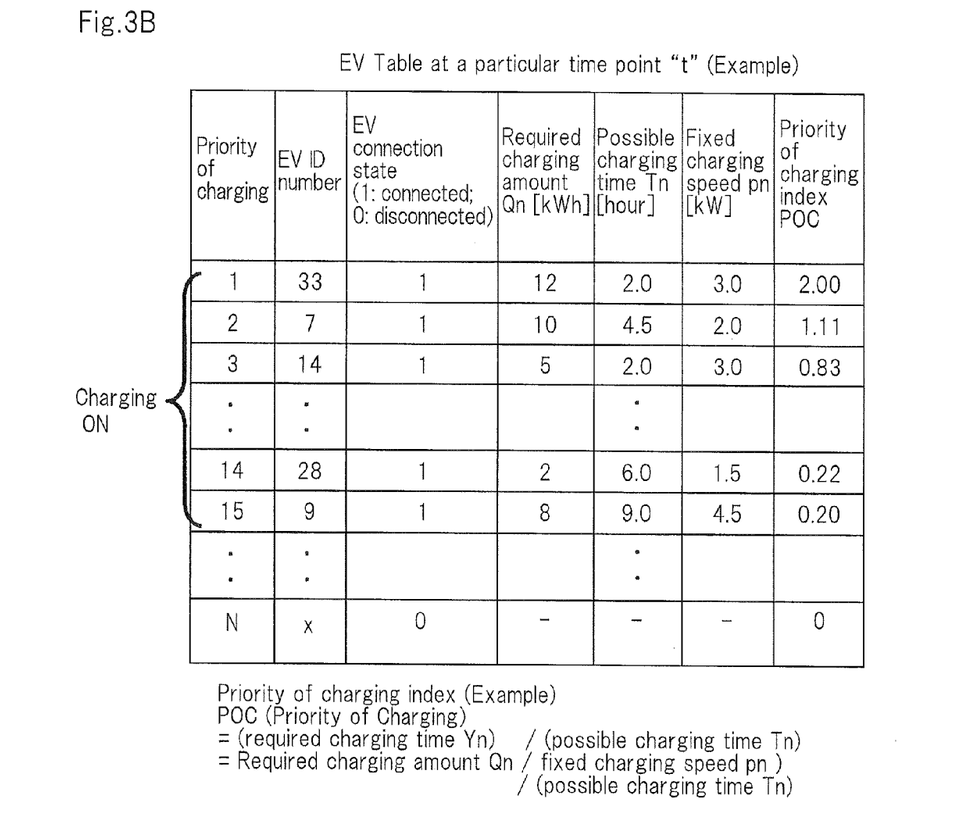
FIG. 3B shows an example of an EV table.

No particular limitations apply to the definition of the index for determining the priority of charging. As one example, in FIG. 3B, priority order assignment unit 20 calculates a required charging time Yn by dividing the required charging amount Qn by the inherent charging speed pn and then uses as the priority of charging index (POC) a value obtained by further dividing the required charging time Yn by the possible charging time Tn. In FIG. 3B, priority order assignment unit 20 determines the charging order of priority of EV based on the priority of charging index (POC) and then shows the state of sorting the records of EV according to the determination result.

Charging control unit 32 next selects charging-object EVs (charging-object vehicles) according to the order of priority until the total charging demand Ptotal(t) that is the total sum when the charging speed Pn(t) of each EV (i.e., the charging amount per unit time) is added in order from EVs having the highest priority most closely approaches the charging demand target value Ptotal_target(t).

Charging control unit 32 sets charging for charging-object EVs to ON, i.e., sets Pn(t)=pn, and sets charging for other EVs to OFF, i.e., sets Pn(t)=0 (Step B).

The real-time electric power demand response as well as the scheduling of the charging speed Pn(t) (=pn or 0) at each time point in each EV is thus carried out by the above-described procedure.

The total charging demand at each time point as seen from the electric power system network (electric power supply) side is the sum total Ptotal(t) for all EVs at each time point of this Pn(t).

If charging is carried out at the charging demand target value Ptotal_target(t) without change after a real-time response, a change in the original total charge amount ΣQn can be expected to occur. In other words, the concern will arise that there will be EVs that have not reached the desired charging amount at the time of departure.

Accordingly, in order to compensate for alterations to this total charge amount ΣQn, setting unit 31 preferably redefines the total charging demand target value Ptotal_target(t) in real time immediately after a real-time response.

By using the above-described method, a system can be constructed as adjustment means that handles EV charging demands, whereby fluctuations in the output of a renewable power source can be absorbed.

FIG. 3B also shows EVs for which the POC has attained a value equal to or greater than 1. An EV for which the POC has become equal to or greater than 1 corresponds to a case in which the possible charging time is already shorter than the required charging time at the time point at which the EV connected to the charging equipment (power distribution network). Because the charging speed and the scheduled departure time are fixed, the charging control side has no recourse but to raise the order of priority of charging and carry out charging as long as time permits. In this case, the desired charging amount at departure time obviously cannot be attained.

Although explanation in the present exemplary embodiment has focused on a G2V system that controls only the charging of EV, by extending the scope such as by permitting the minus sign in the charging speed, the embodiment can also be applied to a typical V2G system that includes discharging from EVs.

An actual example of the above-described charging control method is next described together with the results of simulation.

Figure 4:
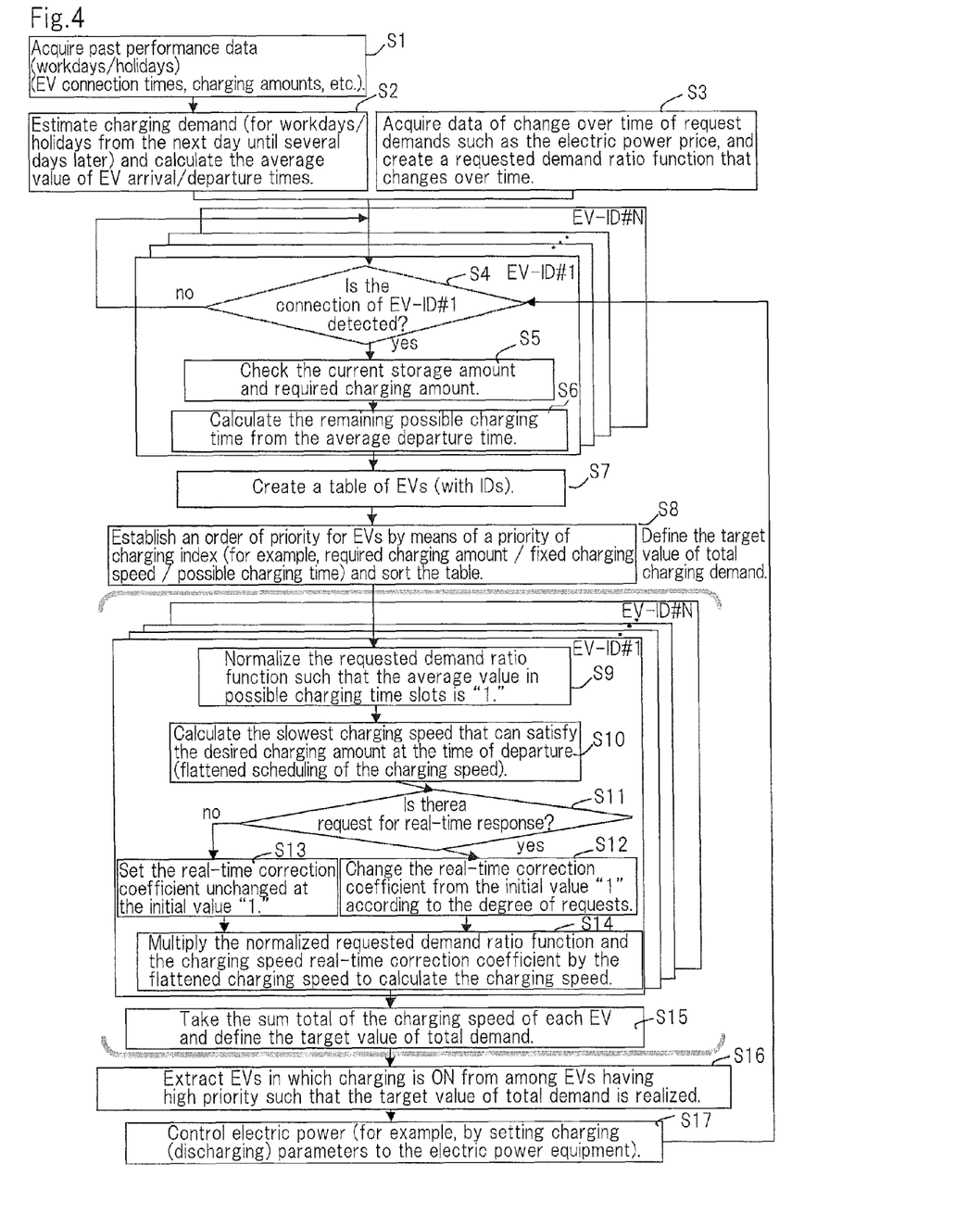
FIG. 4 is a view for describing an example of the charging control system shown in FIG. 1.

FIG. 4 is a view for describing an actual example of the charging control method in the charging control system shown in FIG. 1.

Connection completion time acquisition unit 13 first acquires past performance data (for both workdays and holidays) relating to the charging equipment (power distribution network) connection times and charging amounts of each EV (Step 1).

Connection completion time acquisition unit 13 next both estimates (for the following day until several days after for both workdays and holidays) the charging demand at each time point based on the past performance data and calculates the average value (estimated value) of the time points of arrival (connection to charging equipment) and departure (detachment from charging equipment) of EVs (Step 2).

In parallel with these procedures, electric power demand request acquisition unit 11 acquires from the electric power supply side data of changes over time (including for example electric power prices) of the requested power demands that is to be the target of charge demand control. These data are the electric power demands requested from the electric power supply side and are subject to changes over time.

Requested demand ratio function calculation unit 31a then calculates the requested demand ratio function F'(t) that changes over time based on these data (Step 3). However, at this point, normalization has not been carried out within the possible charging time of each EV, and this function is shared among all EVs. No particular limitations apply to the method of calculating this requested demand ratio function F'(t). In this example, the requested demand ratio function F'(t) is calculated as:

requested demand ratio function F'(t) before normalization=(maximum electric power price−electric power price)÷(maximum electric power price−minimum electric power price)

Figure 5A:
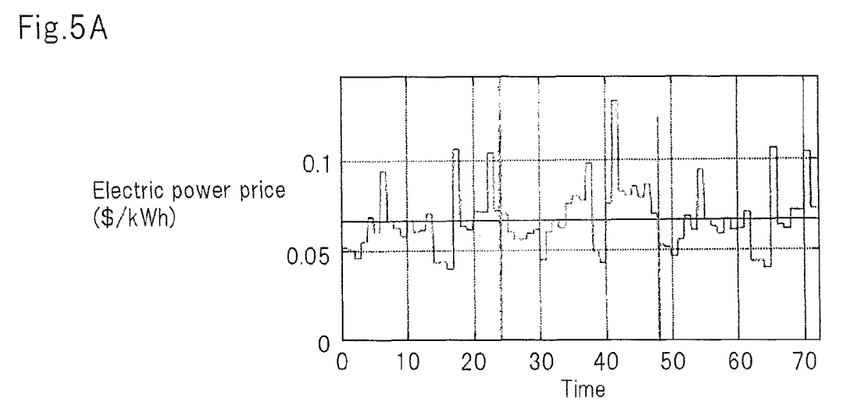
FIG. 5A shows data that are acquired in the electric power demand request acquisition unit.
Figure 5B:
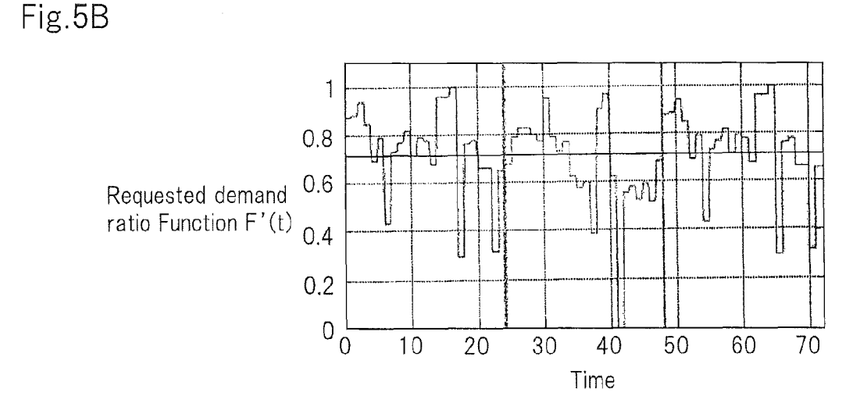
FIG. 5B shows requested demand ratio function F'(t) that is calculated in the requested demand ratio function calculation unit.

FIG. 5 shows views for describing the process in requested demand ratio function calculation unit 31a. FIG. 5A shows the data acquired by electric power demand request acquisition unit 11. FIG. 5B shows requested demand ratio function F'(t) that is calculated in requested demand ratio function calculation unit 31a.

Requested demand ratio function calculation unit 31a calculates the requested demand ratio function F'(t) that changes together with the passage of time as shown in FIG. 5B according to the electric power price that changes together with the passage of time as shown in FIG. 5A.

This requested demand ratio function F'(t) is described here only because it is necessary when showing an example of the method of defining the target value Ptotal_target(t) of total charging demand, but when using another method of defining the target value of the total charging demand, there is no particular need to calculate this ratio function.

After the above-described preparation, connection detection unit 12 detects the connection of EVs to the charging equipment (power distribution network) (Step 4), and charging amount acquisition unit 14 acquires the current charged amount Zn and required charging amount Qn for each EV, and fixed charging speed acquisition unit 15 acquires the fixed charging speed pn that is inherent to each EV for each of these EV (Step 5).

Possible charging time calculation unit 21 then, based on the scheduled (estimated) departure time that was calculated by connection completion time acquisition unit 13 and the current time, calculates the possible charging time Tn that is the guaranteed continuous time of connection to the charging equipment (power distribution network) that takes a margin into consideration (Step 6). The simulation shown here assumes that 50 EVs will be used in commuting (the EVs will be driving during the morning and evening).

Figure 6:
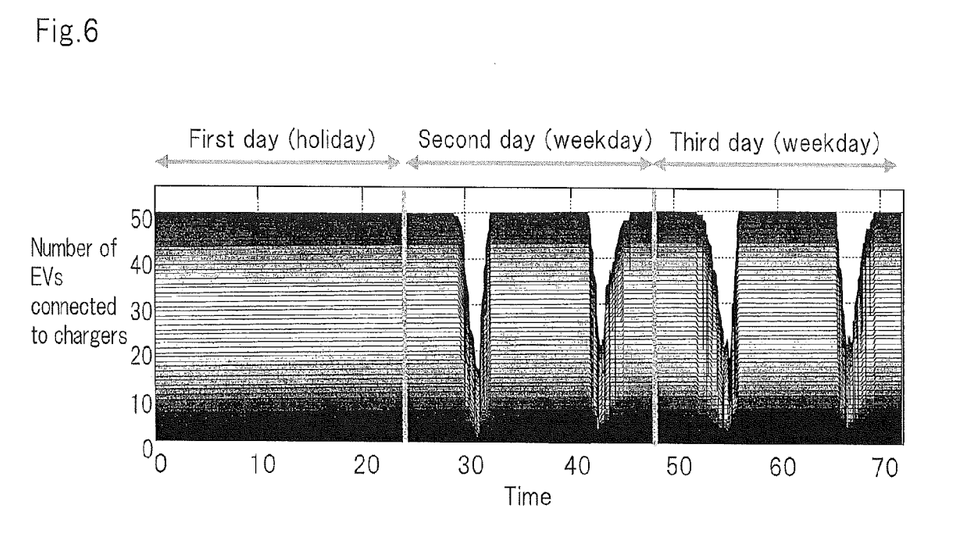
FIG. 6 shows an example of the charger connection pattern of 50 EVs.

FIG. 6 shows an example of the charging equipment connection pattern for 50 EVs.

In the present exemplary embodiment, it is assumed that a random charging equipment (power distribution network) connection pattern (for a three-day interval of holiday/weekday/weekday) such as shown in FIG. 6 is generated for each EV and that the EVs are all connected to the charging equipment during the time intervals in which the EVs are not being driven, i.e., that all EVs are the objects of charging control, and the present embodiment is applied to this situation.

Index calculation unit 22 next calculates a numerical POC that is the index of the priority of charging for each predetermined time point and creates a table (see FIG. 3B) that consolidates these values for each predetermined time point (Step 7).

Priority order determination unit 23 then uses the priority of charging index POC to sort this table and determines the charging order of priority of EVs for each time point (Step 8).

Although no particular limitations are imposed relating to priority of charging index POC as previously stated, FIG. 4 shows an example in which [required charging amount Qn÷fixed charging speed pn÷possible charging time Tn] is taken as the index.

Target value setting unit 31e then sets the target value Ptotal_target(t) of the total charging demand that is to be the target.

Figure 7A:
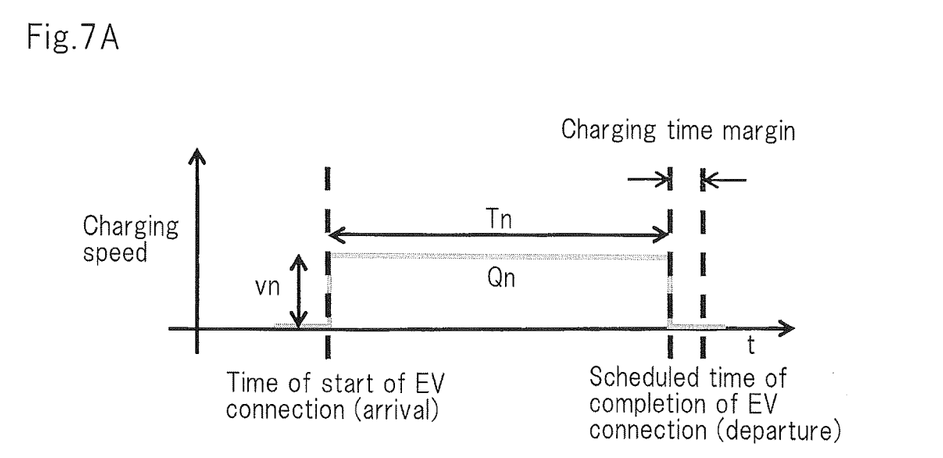
FIG. 7A shows a summary of the method of defining the target value of all charge demands.
Figure 7B:
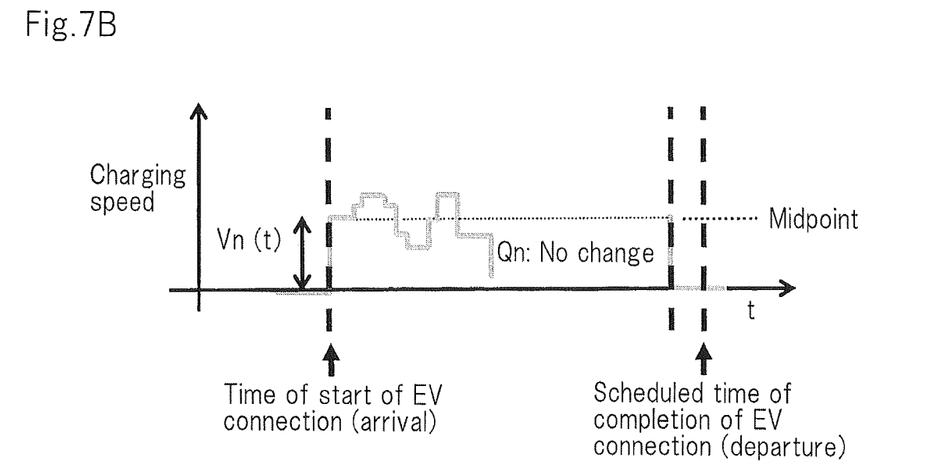
FIG. 7B shows a summary of the method of defining the target value of total charge demands.

Although no particular limitation is imposed on the method of setting this target value of the total charging demand, an example was shown in the outline explanation of the method of defining the target value of the total charging demand in FIGS. 7A and 7B and the flow chart of FIG. 4.

Normalization unit 31c first normalizes F'(t) such that the average value within a possible charging time slot is "1" for each EV, and then calculates the requested demand ratio function Fn(t) (Step 9).

In addition, in a case in which it is assumed that the charging speed can change virtually continuously, flattened charging speed calculation unit 31b calculates the flattened charging speed vn, i.e., the slowest charging speed that can still satisfy the desired charging amount at the departure time by dividing the required charging amount Qn by the possible charging time Tn for each EV (Step 10).

When there is a sudden electric power demand request from the electric power supply side (Step 11), correction coefficient calculation unit 31d, according to the degree of the request, changes the real-time correction coefficient C(t) of the virtual charging speed to any value from "1" that was set as the initial value (Step 12).

On the other hand, when there is no sudden electric power demand request from the electric power supply side (Step 11), correction coefficient calculation unit 31d leaves the realtime correction coefficient C(t) of the virtual charging speed unchanged at "1" that was set as the initial value (Step 13).

Target value setting unit 31e next multiplies the virtual flattened charging speed vn by the normalized requested demand ratio function Fn(t) and the real-time correction coefficient C(t) to calculate the virtual charging speed Vn(t) at each time point for each EV (Step 14).

Target value setting unit 31e next defines (sets) the total sum of this virtual charging speed Vn(t) for all EVs as the target value Ptotal_target(t) of the total charging demand (Step 15).

After the target value Ptotal_target(t) of the total charging demand has been defined by means of procedures such as those described above, charging control unit 32 selects charging-object EVs (charging-object vehicles) in accordance with the order of priority until the total charging demand Ptotal(t), which is the sum total when the charging speeds Pn(t) of each EV (the charging amount per unit time) are added starting from EVs having higher order of priority, becomes closest to the charging demand target value Ptotal_target(t). Charging control unit 32 sets charging to ON, i.e., sets Pn(t)=pn for charging-object EVs and sets charging to OFF, i.e., sets Pn(t)=0 for other EVs. By means of the above-described procedures, charging control unit 32 determines the charging speed Pn(t) (pn or 0) at each time point for each EV (Step 16).

Charging control unit 32 next communicates charging speed Pn(t) to each EV charging apparatus, whereby the control of the charging equipment, i.e., the electric power demand control, is finally realized (Step 17).

Figure 8A:
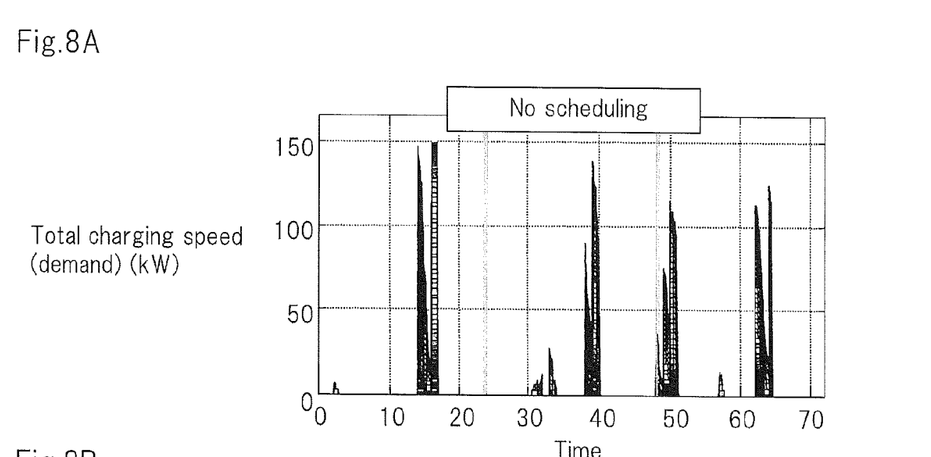
FIG. 8A shows the result of simulating changes in the form of total charging demands when the number of EVs is assumed to be 50.
Figure 8B:
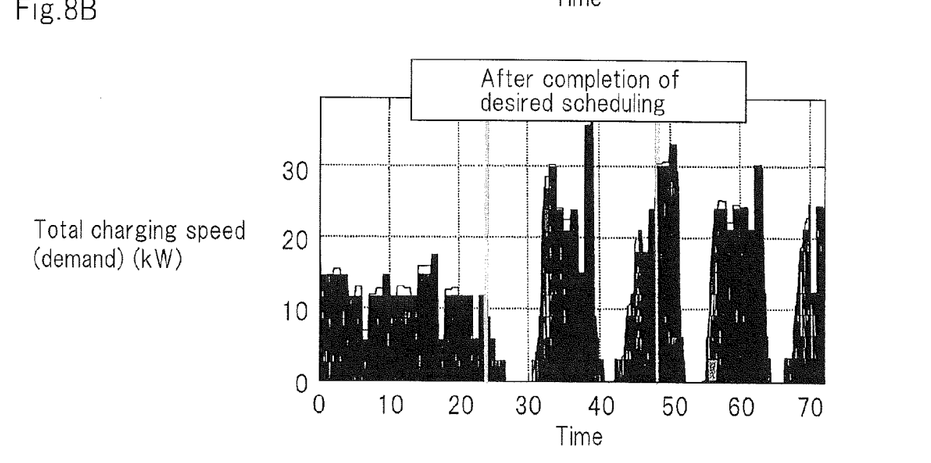
FIG. 8B shows the result of simulating changes in the form of total charge demands when the number of EVs is assumed to be 50.

FIG. 8 shows the results of simulating the changes in the form of total charging demand for a case that assumes 50 EVs. However, it is here assumed that there was no demand for real-time response and C(t) was made to equal "1" in all time slots.

FIG. 8A shows, for reference, the result for a case in which charging scheduling is not carried out by the present exemplary embodiment, in other words, for a case in which each EV owner independently carried out charging scheduling such that charging cost was minimized based on electric power price data that change over time.

In the case shown in FIG. 8A, the charging demand concentrates at specific times, although the results also depend on the form of the electric power price curve that is the starting point for decision-making. As a result, rather than absorbing fluctuations in the output of a renewable power source, these results indicate the potential for additionally incurring large and steep fluctuations in demand.

In contrast, FIG. 8B shows the result of the scheduling of charging of the present exemplary embodiment. In FIG. 8B, the solid line that is depicted substantially edging the graph that indicates the electric power demand represents the target value Ptotal_target(t) of the total charging demand.

In the example shown in FIG. 8B, charging scheduling is realized that substantially accurately reproduces the form of the requested demand ratio function F'(t) shown in FIG. 5B for each time slot. As a result, in this case, the function of controlling electric power demand of a multiple-EV linked charging system is sufficient to serve as the adjustment means for fluctuations in the output of a renewable power source.

In the present exemplary embodiment, moreover, priority order assignment unit 20 resets the order of priority of EVs together with the passage of time. As a result, large disparities in the opportunities of charging for each EV can be reduced.

Despite the apparent increase in the burden of charging costs borne by the owner of each EV resulting from the charging control realized by the present exemplary embodiment, in actuality, because it can be assumed that the present exemplary embodiment is used in a business model in which a value equivalent to the contribution to stabilization of the electric power system will be fed back from the electric power supply side by way of the operator of the multiple-EV linked charging system, the charging costs borne by each EV owner can be expected to decrease.

Still further, changing the value of C(t) in real time from the initial value of "1" to any value enables a "real-time response" to sudden variations in electric power demands.

However, if charging is simply continued based on the charging demand target value Ptotal_target(t) after a real-time response to electric power demands, a change can be expected to occur in the original total charging amount ΣQn. In other words, the concern will arise that there will be EVs that will not reach the desired charging amount at the time of departure. Accordingly, in order to compensate for the change in the total charging amount ΣQn immediately after a real-time response, redefinition (resetting) of the total charging demand target value Ptotal_target(t) is preferably implemented in real time. In this way, the certain attainment of the desired charging amount at the departure time of the EV can be realized.

When the connection time of charging equipment is cut short at the convenience of an EV owner, the certain attainment of the desired charging at departure time is of course no longer possible. However, if a departure that is earlier than scheduled is reported to the charging control side as soon as possible, the order of priority can be raised by updating the possible charging time, whereby the possibility of attaining the desired charging at the time of departure can be increased.

Finally, the explanation of the method for determining the order of priority of charging is supplemented hereinbelow.

In addition to the method shown in the exemplary embodiment described above, the following methods of determining order can be considered. These methods may be used independently or may be used in combination. A combination of methods is effective when it is desired to determine priority for the same EV by yet another measure as the priority POC.

(A) The method of determining the priority of charging may take as an index (POC) the load amount upon the charging means and equipment such as the charger itself, the cable that connects the EV and charger, and the connectors. This method is effective when, for example, the concern arises that the concentration of the charging demands may exceed the specified capacity of the above-described charging means and equipment and the charging demands must therefore be dispersed spatially or over time.

(B) The method of determining priority of charging may take as an index (POC) the state of the storage battery, such as the amount of load upon the storage battery in the EV, the remaining life of the storage battery, and the storage rate (SOC). This is an effective method of determining priority when the protection or longer life of the storage battery in an EV are to be prioritized, carrying out early and fixed charging depending on the charging amount and charging rate (SOC) and avoiding a specific charging amount or charging rate (SOC) is effective in some cases.

(C) The method of determining priority of charging may take as an index (POC) the local amount of load upon the electric power distribution network and equipment (electric power distribution lines) from the power plant up to arrival at the charger. As with method (A), the concern may arise that the specified capacity of common or shared electric power facilities will be exceeded by concentration of charging demand, and this method is effective when the charging demand must be dispersed spatially or over time.

(D) The method of determining priority of charging may take as an index (POC) the contracted fee or the provisions of a contract guaranteeing service quality that has been concluded between the EV owner and the provider of charging control. This method prioritizes charging for specific EV users that takes as a basis a contract relating to service quality similar to, for example, a guarantee of bandwidth in the field of communication.

(E) An index (POC) may be used that is based on any one of, or a combination of a plurality of: the charging amount of an EV, the charging rate of an EV, the permissible range of the charging amount of an EV, the permissible range of the charging speed of an EV, the desired charging amount that is necessary for an EV, the desired charging rate that is necessary for an EV, the permissible charging speed of an EV, the time necessary for desired charging in an EV, and the possible charging time of an EV. For example, an index (POC) may be used that is based on the value calculated by the formula: (desired charging amount, desired charging rate, or time necessary for desired charging)/(possible charging time).

The effects of the present exemplary embodiment are next described.

The present exemplary embodiment allows circumvention at any time of the concentration of charging to limited EV or to parking areas of these EVs (the dispersal or minimization of load upon the internal storage batteries of EVs or upon the charging infrastructure). This is because, when a priority of charging index has been adopted in which priority of charging changes moment to moment, the charging load may be dispersed automatically.

In addition, real-time requests (requests to change demand) to the adjustment means can be dealt with. This is because the adoption of "(necessary charging time Yn)÷(possible charging time Tn)" as the priority of charging index automatically maximizes the degree of freedom for shifting charging times if the total EV charging demands are viewed as a whole by carrying out charging starting from EVs having little freedom for shifting of charging times, or alternatively, by postponing the charging of EVs having greater freedom for shifting of charging times. In addition, when determining the charging speed of each EV in real time, adaptability is improved by the exclusion of lengthy calculation procedures up to charger control by considering the mid- to long-term "advance scheduling" portion as independent through the separate introduction of a correction coefficient.

In addition, scheduling can be optimized by means of a low-load calculation process. This is because desired charging scheduling can be completed by using only a simple index to assign priority of charging to EV and without using a high-level mathematical method or optimization algorithm.

In addition, it is possible to ensure scalability for the number of EVs (to cope with a transitional period in which the number of EVs ranges from one to an increased number). This is because the present exemplary embodiment is a charging control algorithm that is basically under no limitations due to the number of EVs.

In addition, the total EV charging demand can be controlled even when the charging speed cannot be continuously adjusted from outside of the EVs. This is because the total EV charging demand is altered by implementing only the ON/OFF adjustment of the charging of each EV instead of through continuous adjustment of the charging speed.

In addition, due to the adoption of a method of defining (setting) the target value of the total charging demand that is described in the present exemplary embodiment, the following effects can be expected.

The certain attainment of desired (full) charging at the time of departure can be realized. As one reason that can be offered for this effect, change does not occur in the total charging amount $\Sigma Qn$ in the initial scheduling when an EV connects to a charger despite the occurrence of any type of electric power demand request because the assumed flattened charging speed vn by which the certain attainment of desired charging is guaranteed when it is assumed that the charging speed can be continuously altered is multiplied by a requested demand ratio function F'(t) that has been normalized such that the average value within the time slot in which charging is possible is "1," and at the same time, even in the event of a real-time response to a sudden request for change in demand, this response is followed immediately by redefining the target value of total charging demand. However, cases are excluded in which the possible charging time is already shorter than the required charging time at the time point at which an EV connects to the charger (power distribution network). In such cases, the charging speed and the scheduled departure time are fixed, and the desired charging amount at the time of departure of course cannot be attained.

The practical application of a multiple-EV linked charging (G2V) system that is capable of power adjustment for fluctuations in the output of renewable power sources can thus be further facilitated.

In the present invention, instead of realizing the processing in electric power aggregators $3a$-$3c$ by means of dedicated hardware, a program for realizing the functions of these components may be recorded on a recording medium that can be read in electric power aggregators $3a$-$3c$, and electric power aggregators $3a$-$3c$ may then be caused to read and execute the program that was recorded on this recording medium. The recording medium that can be read in electric power aggregators $3a$-$3c$ refers to an IC card or memory card, a movable recording medium such as a floppy disk (registered trademark), a magneto-optical disk, a DVD, or a CD, or an HDD that is incorporated in electric power aggregators $3a$-$3c$. The program that is recorded on this recording medium is, for example, read into control blocks, and processing similar to the processing described hereinabove is then carried out by the control of the control blocks.

Although the invention of the present application has been described with reference to exemplary embodiments, the invention of the present application is not limited to the above-described exemplary embodiments. The configuration and details of the invention of the present application are open to various modifications within the scope of the invention of the present application that will be understood by one of ordinary skill in the art.

This application claims the benefits of priority based on Japanese Patent Application No. 2011-047838 for which application was submitted on Mar. 4, 2011 and incorporates by citation all of the disclosures of that application.

EXPLANATION OF REFERENCE NUMBERS 1 electric power distribution network and information communication network
2 substation
2a electric power control server
3a-3c electric power aggregators
4a, 4b, 4c, 4d HEMS
5a-5l electric vehicles EVs
6 high-capacity energy storage
7 small community
8 parking area
9 fast charging station
10 acquisition unit
11 electric power demand request acquisition unit
12 connection detection unit
13 connection completion time acquisition unit
14 charging amount acquisition unit
15 fixed charging speed acquisition unit
20 priority order assignment unit
21 possible charging time calculation unit
22 index calculation unit
23 priority order determination unit
30 control unit
31 setting unit
31a requested demand ratio function calculation unit
31b flattened charging speed calculation unit
31c normalization unit
31d correction coefficient calculation unit
32 charging control unit

What is claimed is:

1. A charging control system that controls charging of a plurality of vehicles that run on electric power, the charging control system comprising:
an assignment unit that, based on a predetermined index, assigns to said plurality of vehicles an order of priority relating to charging;
a receiving unit that receives electric power demands that are requested from an electric power supply side; and
a control unit that selects from among said plurality of vehicles, in higher orders according to order of said order of priority, charging-object vehicles in which an ON/OFF setting for ON/OFF of said charging is to be set to ON and sets the ON/OFF setting of said charging-object vehicles to ON,
wherein said control unit changes a number of said charging-object vehicles according to changes of said electric power demands over time,
wherein said assignment unit uses, as said predetermined index, an index that is based on at least one of a charging amount of said vehicles, a charging rate of said vehicles, a permissible range of charging amount of said vehicles, a permissible range of charging rate of said vehicles, a desired charging amount that is necessary for said vehicles, a desired charging speed that is necessary for said vehicles, a permissible charging speed of said vehicles, a time interval required for said desired charging amount in said vehicles, and a time interval in which charging of said vehicles is possible, and
wherein said assignment unit uses, as said predetermined index, an index that is based on a value that is calculated by a formula:

(said desired charging amount, said desired charging rate, or said time interval required for said desired charging)/(said time interval in which said charging is possible).

2. The charging control system as set forth in claim 1, wherein said control unit controls a charging unit that is connected to a vehicle to control the ON/OFF of charging of that vehicle, and
wherein said assignment unit uses, as said predetermined index, a load amount of said charging unit or a load amount of electric power distribution lines that supply electric power to said charging unit.

3. The charging control system as set forth in claim 1, wherein said assignment unit uses, as said predetermined index, a state of a storage battery that is installed in a vehicle and for which ON/OFF of said charging is controlled.

4. The charging control system as set forth in claim 1, wherein said assignment unit uses, as said predetermined index, a content of a contract concluded between an owner of a vehicle and a provider of said charging control system.

5. The charging control system as set forth in claim 1, wherein said electric power demands requested from the electric power supply side include sudden electric power demands.

6. The charging control system as set forth in claim 1, wherein said control unit calculates a charging amount per unit time of said plurality of vehicles based on a function that represents the change over time of said electric power demands that are requested from the electric power supply side, uses a total sum of the charging amount to set a target value of charging demand, and changes the number of said charging-object vehicles according to said target value.

7. The charging control system as set forth in claim 1, wherein the assignment unit is configured to calculate a possible charging time from a scheduled time of a connection completion and a desired charging time margin.

8. The charging control system as set forth in claim 7, wherein the assignment unit is further configured to determine the order of priority relating to the charging based on the possible charging time, a required charge amount, and an inherent charging speed of each of said vehicles.

9. The charging control system as set forth in claim 1, wherein the assignment unit comprises a charging time calculation unit that, based on a scheduled departure time and a current time, calculates a possible charging time that includes a guaranteed continuous time of connection to a charging equipment.

10. The charging control system as set forth in claim 1, wherein the assignment unit is configured to determine the order of priority relating to the charging based on a possible charging time, a required charge amount, and an inherent charging speed of each of said vehicles.

11. A charging control method in a charging control system that controls charging of a plurality of vehicles that run on electric power, the charging control method comprising:
based on a predetermined index, assigning to said plurality of vehicles an order of priority relating to charging;
receiving electric power demands that are requested from an electric power supply side; and
selecting from among said plurality of vehicles in higher orders according to order of said order of priority charging-object vehicles in which an ON/OFF setting relating to ON/OFF of said charging is to be set to ON and implementing a control procedure to set the ON/OFF setting of said charging-object vehicles to ON,
wherein, in said control procedure, a number of said charging-object vehicles changes according to changes of said electric power demands over time, wherein, in said assigning to said plurality of vehicles, as said predetermined index, an index is used that is based on at least one of a charging amount of said vehicles, a charging rate of said vehicles, a permissible range of charging amount of said vehicles, a permissible range of charging rate of said vehicles, a desired charging amount that is necessary for said vehicles, a desired charging speed that is necessary for said vehicles, a permissible charging speed of said vehicles, a time interval required for said desired charging amount in said vehicles, and a time interval in which charging of said vehicles is possible, and wherein, in said assigning to said plurality of vehicles, as said predetermined index, an index that is used based on a value that is calculated by a formula:

(said desired charging amount, said desired charging rate, or said time interval required for said desired charging)/
(said time interval in which said charging is possible).

12. The charging control method as set forth in claim 11, wherein said assigning to said plurality of vehicles comprises calculating a possible charging time from a scheduled time of a connection completion and a desired charging time margin.

13. The charging control method as set forth in claim 12, wherein said assigning to said plurality of vehicles further comprises determining the order of priority relating to the charging based on the possible charging time, a required charge amount, and an inherent charging speed of each of said vehicles.

14. The charging control method as set forth in claim 11, wherein said assigning to said plurality of vehicles comprises, based on a scheduled departure time and a current time, calculating a possible charging time that includes a guaranteed continuous time of connection to a charging equipment.

15. A non-transitory recording medium that can be read by a computer and on which a program is recorded that causes the computer for controlling charging of a plurality of vehicles that run on electric power to execute:

an assignment procedure of based on a predetermined index, assigning an order of priority relating to charging to said plurality of vehicles;

a reception procedure of receiving electric power demands that are requested from an electric power supply side; and a control procedure of selecting from among said plurality of vehicles according to higher orders of said order of priority charging-object vehicles in which an ON/OFF setting for ON/OFF of said charging is to be set to ON and implementing a control procedure to set the ON/OFF setting of said charging-object vehicles to ON, wherein, in said control procedure, a number of said charging-object vehicles changes according to changes of said electric power demands over time, wherein, in said assignment procedure, as said predetermined index, an index is used that is based on at least one of a charging amount of said vehicles, a charging rate of said vehicles, a permissible range of charging amount of said vehicles, a permissible range of charging rate of said vehicles, a desired charging amount that is necessary for said vehicles, a desired charging speed that is necessary for said vehicles, a permissible charging speed of said vehicles, a time interval required for said desired charging amount in said vehicles, and a time interval in which charging of said vehicles is possible, and wherein, in said assignment procedure, as said predetermined index, an index that is used based on a value that is calculated by a formula:

(said desired charging amount, said desired charging rate, or said time interval required for said desired charging)/
(said time interval in which said charging is possible).

16. The non-transitory recording medium as set forth in claim 15, wherein said assignment procedure comprises calculating a possible charging time from a scheduled time of a connection completion and a desired charging time margin.

17. The non-transitory recording medium as set forth in claim 16, wherein said assignment procedure further comprises determining the order of priority relating to the charging based on the possible charging time, a required charge amount, and an inherent charging speed of each of said vehicles.

18. The non-transitory recording medium as set forth in claim 15, wherein said assignment procedure comprises, based on a scheduled departure time and a current time, calculating a possible charging time that includes a guaranteed continuous time of connection to a charging equipment.

* * * * *